United States Patent [19]

Glenn, Jr.

[11] 3,780,212

[45] Dec. 18, 1973

[54] COLOR FILTER AND SINGLE TUBE COLOR TELEVISION CAMERA SYSTEM UTILIZING SAME

[75] Inventor: William E. Glenn, Jr., Stamford, Conn.

[73] Assignee: Columbia Broadcasting System, Inc., New York, N.Y.

[22] Filed: Aug. 30, 1972

[21] Appl. No.: 284,892

[52] U.S. Cl. .......................................... 178/5.4 ST
[51] Int. Cl. .......................................... H04n 9/06
[58] Field of Search .................. 178/5.4 ST, 5.4 TC; 350/317

[56] References Cited

UNITED STATES PATENTS 3,702,725 11/1972 Macovski .......................... 350/317

FOREIGN PATENTS OR APPLICATIONS 8,699 3/1970 Japan .......................... 178/5.4 ST

*Primary Examiner*—Howard W. Britton
*Assistant Examiner*—Fay Konzem
*Attorney*—Martin Novack

[57] ABSTRACT

A system for generating three coherent color component signals representative of the color content of a scene. A color stripe filter is disposed in the optical path of the scene, the filter having three sets of parallel stripes, each set having a different characteristic color and a different orientation in the plane perpendicular to the optical path. Means are provided for electronically scanning the image projected through the filter in a line pattern and for generating signals representative of the filtered image. Delay means responsive to the output of the scanning means simultaneously derive first, second, and third video signals generated during three successive scanlines. Further provided are first, second, and third combining means, each of which combines the three video signals in a different phased relationship to generate one of the coherent color component signals. In a preferred embodiment of the invention, yellow, cyan, and magenta colored stripes are utilized to derive the red, green and blue primary color signals.

18 Claims, 4 Drawing Figures

COLOR FILTER AND SINGLE TUBE COLOR TELEVISION CAMERA SYSTEM UTILIZING SAME

BACKGROUND OF THE INVENTION

The type of color television camera that is currently in most widespread use employs three image pickup tubes to derive separate primary color signals. These cameras have limited acceptability because they are expensive and difficult to maintain. For this reason, there have been a number of recent attempts at developing color cameras which require less than three tubes to produce the desired color signals. Many of these schemes involve the use of patterned filters in the optical path of the camera.

In one of the single tube techniques, the sole camera tube receives the color scene through an optical filter composed of recurring vertical striped sections. Each striped section includes a red, a blue, and a green filter stripe, so that signals corresponding to the three primary colors can be generated by the one camera tube. In this system, limitations of the scan linearity of the tube's scanning beam necessitate that indexing signals be provided so that a reference exists for sampling the proper color at the proper time during the beam scan. Therefore, each striped section includes a black indexing stripe that is used to generate an indexing signal. This technique has the disadvantage of consuming essential filter space and introducing a large number of recurring discontinuities in the scanning of the color scene.

Another class of single tube prior art systems operates on the basis of an assignment of a specific frequency to each color signal. In these systems, different orientation angles are provided for the different stripe colors and the generated chrominance signal components are distinguished from each other by frequency. Separation is achieved using electronic filters. These types of systems are desirably insensitive to scan nonlinearity since the resulting frequency changes are not large enough to significantly alter the selectivity characteristics of the separation filters. However, a problem with these systems stems from the crowding of the frequency spectrum, since substantial bandwidth need be provided for each of the different color signals.

Still another recently suggested single tube camera scheme utilizes two sets of colored stripes, oriented at angles to each other, each set containing stripes of a single color. The stripe angles are arranged such that the first stripe set produces signals which are in phase for successive scanlines and the second stripe set produces signals which are 180° out of phase for successive scanlines. Using a delay of one horizontal scanline, the signals from successive lines are added to recover the first color, e.g., red, and subtracted to recover the second color, e.g., blue. This can be done since conventional resolution standards do not require independent color information from every scanline to achieve adequate vertical color detail. A luminance signal Y is obtained by low pass filtering, and the third primary, green, is developed from the Y, red, and blue signals. A scheme of this type is disclosed, for example, in the U.S. Pat. No. 3,647,943.

The last-mentioned technique for obtaining desired color information signals with a single tube has the advantage of obviating the need for black indexing stripes. Another advantage is that the two sets of stripes can have the same characteristic frequency so that bandwidth is conserved. However, a serious drawback of this scheme is the same one which has in the past plagued two-color camera systems; i.e., the tendency of the system to generate spurious green (the derived primary) when highlights are present in the viewed scene or when focus is lost. The problem is exemplified by a situation when a target portion of the single tube is impinged upon by a bright white scene area. When the tube saturates in the particular target area, the color carrier is lost and the high luminance without proportionately high red and blue component signals is usually interpreted by the system as green. In a manner of speaking, the system "knows" it is looking at a bright area, but is limited in its capability of distinguishing the color of the highlight.

It is among the objects of the present invention to deal with this and other disadvantages of the prior art and to generally make improvements responsive to the discussed needs.

SUMMARY OF THE INVENTION

The present invention is directed to a system for generating three coherent color component signals representatitve of the color content of a scene. In accordance with the invention, a color stripe filter is disposed in the optical path of the scene, the filter having three sets of parallel stripes, each set having a different characteristic color and a different orientation in the plane perpendicular to the optical path. Means are provided for electronically scanning the image projected through the filter in a line pattern and for generating signals representative of the filtered image. Delay means responsive to the output of the scanning means simultaneously derive first, second, and third video signals generated during three successive scanlines. Further provided are first, second and third combining means, each of which combines the three video signals in a different phased relationship to generate one of the coherent color component signals.

In a preferred embodiment of the invention, one stripe set is oriented such that the successive scanlines yield signals having a +120° phase shift with respect to each other, another set of stripes are oriented such that successive scanlines yield signals having a −120° phase shift with respect to each other, and a third set of stripes yield signals having a 0° phase shift from line to line. In this embodiment, the combining means utilize phase shifts that are multiples of 120° to derive signals that are modulated by only one of the sets of stripes. When yellow, magenta, and cyan colored stripes are used, the three derived color signals are red, blue and green. These color signals can be matrixed with a derived luminance signal to form a composite color signal that substantially eliminates the color distortions that arise when using a two color setup of the type previously described.

Further features and advantages of the invention will become more readily apparent from the following detailed description when taken in conjunction with the accompanying drawings.

DESCRIPTION OF THE PREFERRED EMBODIMENT

Figure 1:
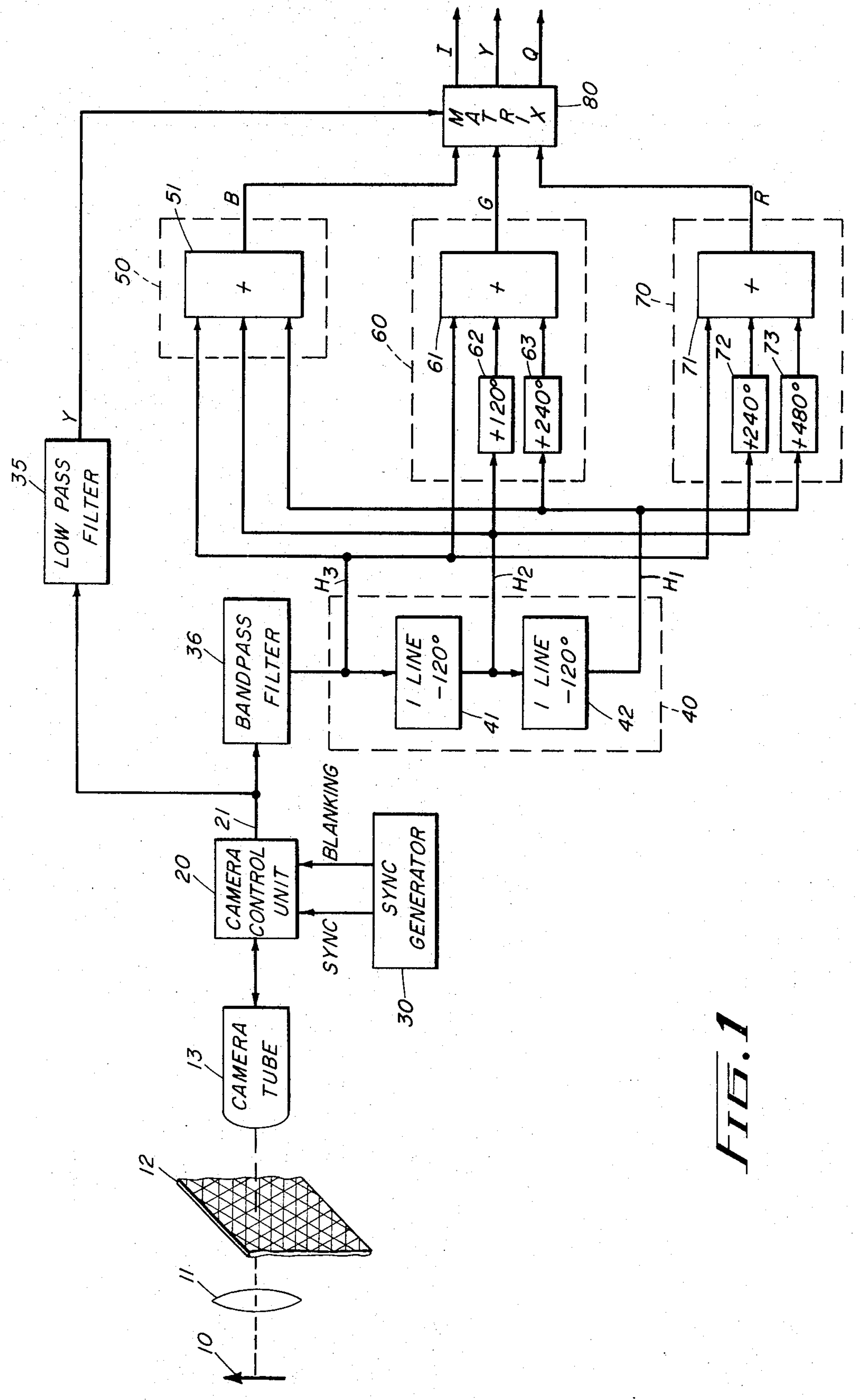
FIG. 1 is a block diagram of an embodiment of a color television camera system in accordance with the invention.

Referring to FIG. 1, there is shown a color television camera system in accordance with the present invention. Light from an object field 10 is collected by an optical system represented pictorially by the lens 11. The collected light passes through a filter 12 that has an array of colored areas thereon. The filtered light from the object field is received by an electronic scanning device or tube 13 that may typically comprise a vidicon or plumbicon of the type associated with a standard black and white television camera. The filter may be disposed on a fiber optics faceplate that is adjacent the photosensitive surface of the tube. The tube 13 is controlled by a conventional camera control unit 20 which receives vertical and horizontal synchronizing signals and blanking signals from a conventional sync generator circuit 30.

Figure 2:
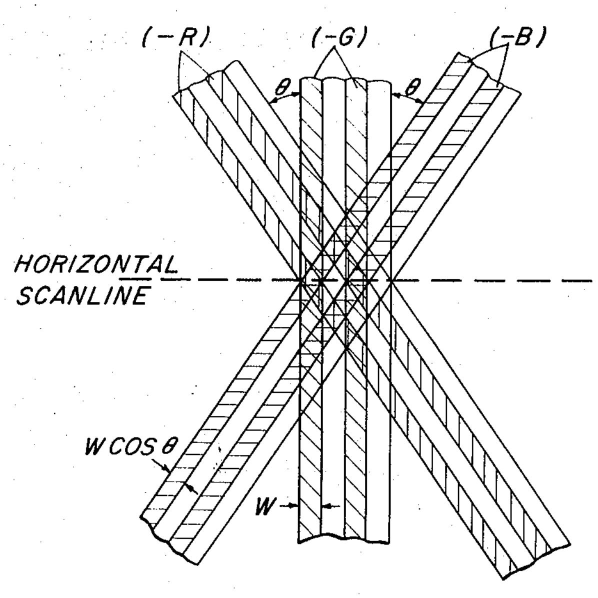
FIG. 2 is a representation of the stripe orientations of a filter in accordance with an embodiment of the invention.

The filter 12 has three sets of superimposed parallel stripes which alternate with transparencies. Each set has a different characteristic color and a different orientation within the plane perpendicular to the optical path of the light from the object field 10. A representation of the relative stripe orientations is depicted in FIG. 2 wherein two stripes from each set are shown. In the preferred embodiment, the three stripe colors utilized are the complements of the primaries red (R), green (G), and blue (B); viz, cyan (−R), magenta (−G) and yellow (−B), respectively. In this particular embodiment, the magenta stripe is arbitrarily selected as having an orientation of 0° which is conveniently chosen as the vertical; i.e., normal to the direction of horizontal line scanning of the camera tube 13. The yellow stripes are oriented at an angle designated as $+\theta$ with respect to the vertical and the cyan stripes are oriented at an angle designated as $-\theta$ with respect to the vertical. The basic carrier frequency associated with each stripe set is about 4.5 Megahertz (MHz). In the case of the magenta stripes, the stripe widths, $w$, are selected such that about 235 stripes cover the active scan area. This achieves the desired frequency for an active horizontal scan time of about 52.2 microseconds; i.e., $235 \div (52.2 \times 10^{-6})$. The yellow and cyan stripes are then selected as having narrower widths of $w\cos\theta$ which yields the same effective carrier frequency of 4.5 MHz for the yellow and cyan colors since these stripes are traversed horizontally at a widened ratio of $1/\cos\theta$ with respect to the vertical stripes.

As stated, the camera tube 13 (FIG. 1) is of the conventional black and white variety, so it has no ability to determine the color of the impinging light, but detects only the intensity at successive points on the target area. The camera tube output, represented as the signal on a line 21, includes a relatively low frequency monochrome component that contains chrominance information. The high frequency chrominance component is present by virtue of the stripe patterns which serve to effectively divide the object scene into color components as a function of position.

The camera tube output on line 21 is coupled to a low pass filter 35 which has a filter characteristic that passes frequencies between about 0 MHz and 3.5 MHz. This filter rejects the chrominance component of the camera output, which was seen above to be a frequency of about 4.5 MHz, and passes the lower frequency information which represents luminance content of the scene being observed. The stripes in the pattern of the present embodiment are sufficiently narrow to yield an acceptable bandwidth luminance signal and still have sufficient bandwidth remaining to contain color information.

The signal on line 21 is also coupled to a band-pass filter 36 which has a center frequency at 4.5 MHz to select the color component from the camera signal. The output of the filter is coupled to a delay means 40, shown in dashed enclosure, which produces three signals designated as $H_3$, $H_2$ and $H_1$ that represent the camera color output at related points on three successive horizontal scanlines. Signal $H_3$ is an undelayed version of the present camera output signal. A delay line 41, which provides a delay of 120° less than one horizontal scanline, receives the undelayed camera signal and produces the signal $H_2$. The 120° relates to the phase of the color carrier component of the camera tube output. A 4.5 MHz signal has a period of about 0.222 microseconds, so it follows that 120° is equivalent to a time duration of about 0.074 microseconds. The full duration of one horizontal scanline is 63.555 microseconds, so the delay provided by delay line 41 is 63.481 microseconds. The signal $H_2$ is available as an output of delay means 40 and is also received by another delay line 42 that is identical to delay line 41. The third output, $H_1$, therefore has a total delay of two horizontal scanlines minus 240° (127.110 microseconds) with respect to the original signal $H_3$.

The three outputs $H_3$, $H_2$ and $H_1$ are each coupled to combining means that are shown in dashed enclosures and are designated by the reference numerals 50, 60 and 70. The combining means 50 comprises an adder 51 which generates an output that is the summation of the three input signals and which will be later shown to represent a decoded color signal that is dependent on the blue component of that portion of the object scene area being scanned at the particular moment. Combining means 60 includes an adder 61 and delay lines 62 and 63 which respectively provide delays of 120° (0.074 microseconds) and 240° (0.148 microseconds). The delay lines 62 and 63 respectively receive the signals $H_2$ and $H_1$ and their outputs are coupled to the adder 61 along with the undelayed signal $H_2$ to produce a sum that will be shown to represent the green component of that portion of the object scene being scanned at the particular moment. The combining means 70 includes an adder 71 and delay lines 72 and 73 which provide respective delays of 240° (0.148 microseconds) and 480° (0.296 microseconds). The delay lines 72 and 73 respectively receive the signals $H_2$ and $H_1$ and the outputs of these delay lines are added to the undelayed signal $H_3$ to produce an output that will be seen to be dependent upon red. The three color signals B, G, and R and the derived luminance signal Y are received by matrixing circuitry 80 which generates, in known fashion, color difference signals generally designated in the art as I and Q. These signals, in conjunction with Y, can then be processed in conventional manner to form composite color video.

Figure 3:
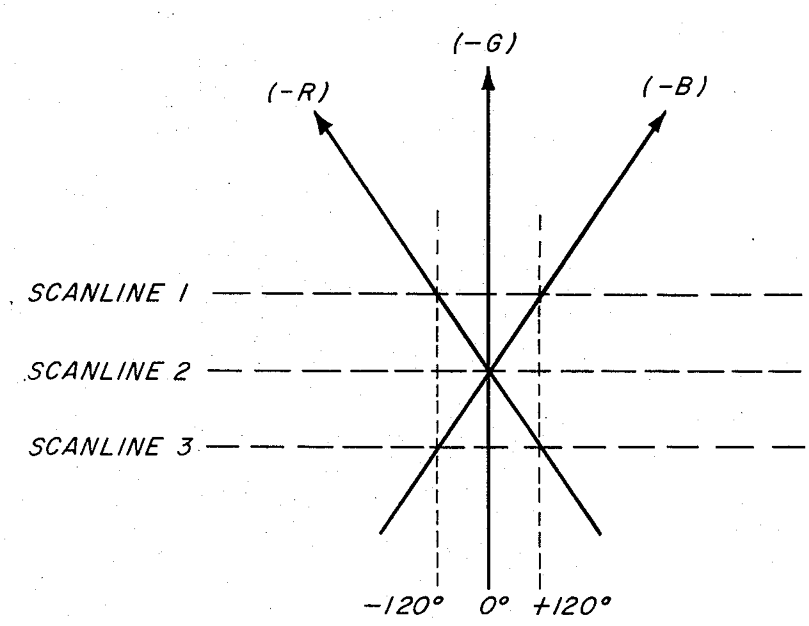
FIG. 3 is a simplified diagram of representative stripes and their relationships with three successive horizontal scanlines.

FIG. 3 is a simplified diagram of representative color stripes and their relationship to three successive horizontal scanlines, the FIGURE being helpful in describing the operation of the portion of the FIG. 1 circuitry which generates the three color component signals. Three arrows shown in solid line and designated as −R, −G, and −B are representative of the three classes of stripes (cyan, magenta, and yellow, respectively) as they are oriented on the filter 12. Three successive scanlines are shown in dashed line and are labeled, in order of occurrence, as scanline 1, scanline 2 and scanline 3. For purposes of explanation, and to establish a relative reference phase with respect to every scanline, the position of the green stripes is assumed to have a relative phase of 0° for each scanline. This is a reasonable assumption since the magenta stripes are vertical and will therefore be traversed by a scanning beam at substantially the same relative time during each of a number of successive scanlines. For example, the particular stripe shown could be thought of as occurring at, say, the 25 microsecond point on each of the scanlines 1, 2 and 3 and this point would then be phase reference 0°. As was indicated above, the yellow and cyan stripes are oriented at relative angles of $+\theta$ and $-\theta$ with respect to the magenta stripes. In the present embodiment, the angle $\theta$ is selected such that the yellow stripes yield a color carrier signal that leads by 120° the color carrier signal which had been generated by the yellow stripes during the previous scanline. Conversely, the cyan stripes yield a color carrier signal which lags by 120° the color signal that had been generated by these stripes during the previous scanline. The selection of an appropriate angle $\theta$ to achieve these relationships is dealt with hereinbelow, it being assumed for the time being that the stripes are properly oriented to give the stated relationships.

Consistent with the stated relationships, two vertical dotted lines are shown in FIG. 3, these lines illustrating the lines of relative phase that define −120° and +120° for the various scanlines with respect to the 0° reference previously established as being at the illustrated magenta stripe. In accordance with the relationships set forth, the cyan stripe has a relative phase of 31 120° at the point where it is crossed on scanline 1, a relative phase of 0° at the point where it is crossed on scanline 2, and a relative phase of +120° at the point where it is crossed on scanline 3. The yellow stripe has a relative phase of +120° at the point where it is crossed on scanline 1, a relative phase of 0° at the point where it is crossed on scanline 2 and a relative phase of −120° where it is crossed on scanline 3. The green stripe, being vertical, has relative phases of 0° associated with it on all three scanlines. In utilizing the simplified diagram of FIG. 3, it should be kept in mind that while only one stripe of each color is depicted, the phase relationships set forth hold true for all stripes of that color since all stripes of that color are parallel and have the same angular relationship with respect to all scanlines.

The diagram of FIG. 3 facilitates understanding the nature of the signals that are generated by the combining means 50, 60 and 70. The signal $H_3$ (FIG. 1) is associated with scanline 3 of FIG. 3 and the signals $H_2$ and $H_1$ are associated with scanline 2 and scanline 1, respectively, of FIG. 3. Mindful of the operation of delay line 41 and 42, the relative phase relationships between the signals $H_3$, $H_2$ and $H_1$ at any given time can be expressed as follows:

$$\text{phase of } H_3 = \text{phase of scanline } 3$$
$$\text{phase of } H_2 = \text{phase of scanline } 2 - 120° \qquad (10)$$
$$\text{phase of } H_1 = \text{phase of scanline } 1 - 240°$$

In examining the functions of the various combining means, it is useful to employ a phase notation $\phi$ to describe the relative phases of the different signals that enter the adders 51, 61 and 71. With the present notation the subscript of a phase $\phi$ represents the scanline number (1, 2 or 3) and the superscript represents an object scene being scanned. Using this notation, we examine first the inputs to the adder 51 when an object area having certain specified colors is present.

Assume first that a red scene area is being scanned. In such case, only the cyan stripes will produce a substantial color carrier signal since the magenta and yellow stripes both ideally will pass 100 percent of the red. Using the relative phase relationships of FIG. 3, it is seen that during scanline 3 the cyan stripe is traversed at a relative phase of +120°, so we have the following expression for $\phi_3^R$, i.e., the phase of the signal from scanline 3 entering adder 51:

$$\phi_3^R = \text{phase of } H_3 = +120°$$

During scanline 2 the cyan stripe is traversed at 0°. Therefore, the expression for $\phi_2^R$, i.e., the phase of the signal from scanline 2 which enters adder 51, is:

$$\phi_2^R = \text{phase of } H_2 = 0° - 120° = -120°$$

where the phase of $H_2$ is taken from the relationships (10) above. During scanline 1 the cyan stripe is traversed at −120°, so the expression for $\phi_1^R$ is:

$$\phi_1^R = \text{phase of } H_1 = -120° - 240° = -360° = 0°$$

where the phase of $H_1$ is again taken from the relationships (10) above.

The inputs to the adder 51 when a green scene area is being scanned are examined next. In this instance, only the magenta stripes will produce a substantial color carrier signal since the cyan and yellow stripes both ideally will pass 100 percent of the green. Using the relative phase relationships of FIG. 3, we see that during scanline 3 the magenta stripe is traversed at a relative phase of 0°. Therefore, the expression for $\phi_3^G$, i.e., the phase of the signal from scanline 3 entering adder 51, is:

$$\phi_3^G = \text{phase of } H_3 = 0°$$

Similarly, the appropriate expressions for $\phi_2^G$ and $\phi_1^G$ are:

$$\phi_2^G = \text{phase of } H_2 = 0° - 120° = -120°$$
$$\phi_1^G = \text{phase of } H_1 = 0° - 240° = -240°.$$

The inputs to the adder 51 when a blue scene area is being scanned are examined next. In such case, only the yellow stripes will produce a substantial color carrier signal since the cyan and magenta stripes both ideally will pass 100 percent of the blue. Again, using the relative phase relationships of FIG. 3, it is seen that during scanline 3 the yellow stripe is traversed at a relative phase of −120°, so we have the following expression for $\phi_3^B$, i.e., the phase of the signal from scanline 3 entering adder 51:

$$\phi_3^B = \text{phase of } H_3 = -120°$$

The expressions for $\phi_2^B$ and $\phi_1^B$ are similarly calculated as follows:

$$\phi_2^B = \text{phase of } H_2 = 0° - 120° = -120°$$

$$\phi_1^B = \text{phase of } H_1 = +120° - 240° = -120°.$$

Next to be examined are the phases of inputs to adder 61 when an object scene area having a specified color is present. In the first case of a red scene area, it is seen that during scanline 3 the cyan stripe is traversed at a relative phase of +120° so the expression for $\phi_3^R$ for adder 61 is:

$$\phi_3^R = \text{phase of } H_3 = +120°.$$

During scanline 2 the cyan stripe is traversed at 0°. In this case, however, signal $H_2$ is passed through delay 62 before being received by adder 61. The appropriate expression for $\phi_2^R$ is therefore:

$$\phi_2^R = \text{phase of } H_2 + 120° = 0° - 120° + 120° = 0°,$$

where the phase of $H_2$ is again taken from the relationships (10) above. During scanline 1 the cyan stripe is traversed at −120° and the signal $H_1$ is passed through delay line 63 before being received by adder 61. Therefore, the appropriate expression for $\phi_1^R$ is:

$$\phi_1^R = \text{phase of } H_1 + 240° = -120° - 240° + 240° = -120°.$$

Using a similar approach, the expressions for the phases of the signals into adder 61 that result for a green scene area and a blue scene area are calculated as follows:

for a green scene area;
$\phi_3^G = \text{phase of } H_3 = 0°$
$\phi_2^G = \text{phase of } H_2 + 120° = 0 - 120° + 120° = 0°$
$\phi_1^G = \text{phase of } H_1 + 240° = 0 - 240° + 240° = 0°$
for a blue scene area;
$\phi_3^B = \text{phase of } H_3 = +120°$
$\phi_2^B = \text{phase of } H_2 + 120° = 0° - 210° + 120° = 0°$
$\phi_1^B = \text{phase of } H_1 + 240° = -120° - 240° + 240° = -120°$ Using similar technique, the phases of the inputs to adder 71 can be derived for object scene areas of different primary color, remembering that the signals $H_2$ and $H_1$ experience delays of 240° and 480° respectively. The appropriate expressions are as follows:

for a red scene area;
$\phi_3^R = \text{phase of } H_3 = +120°$
$\phi_2^R = \text{phase of } H_2 + 240° = 0° - 120° + 240° = +120°$
$\phi_1^R = \text{phase of } H_1 + 480° = -120° - 240° + 480° = +120°$
for a green scene area;
$\phi_3^G = \text{phase of } H_3 = 0°$
$\phi_2^G = \text{phase of } H_2 + 240° = 0° - 120° + 240° = +120°$
$\phi_1^G = \text{phase of } H_1 + 480° = 0° - 240° + 480° = +240°$
for a blue scene area;
$\phi_3^B = \text{phase of } H_3 = -120°$
$\phi_2^B = \text{phase of } H_2 + 240° = 0 - 120° + 240° = +120°$
$\phi_1^B = \text{phase of } H_1 + 480° + 120° - 240° + 480° = +360° = 0°$ The following table summarizes the phase relationships for the signals entering the adders for each object scene area color.

TABLE

ADDER 51

| RED scene area | GREEN scene area | BLUE scene area |
|---|---|---|
| $\phi_3^R=+120°$ | $\phi_3^G=0$ | $\phi_3^B=-120°$ |
| $\phi_2^R=-120°$ | $\phi_2^G=-120°$ | $\phi_2^B=-120°$ |
| $\phi_1^R=0°$ | $\phi_1^G=-240°$ | $\phi_1^B=-120°$ |

ADDER 61

| RED scene area | GREEN scene area | BLUE scene area |
|---|---|---|
| $\phi_3^R=+120°$ | $\phi_3^G=0°$ | $\phi_3^B=+120°$ |
| $\phi_2^R=0°$ | $\phi_2^G=0°$ $\phi_2^B=0°$ | |
| $\phi_1^R=-120°$ | $\phi_1^G=0°$ | $\phi_1^B=-120°$ |

ADDER 71

| RED scene area | GREEN scene area | BLUE scene area |
|---|---|---|
| $\phi_3^R=+120°$ | $\phi_3^G=0°$ | $\phi_3^B=-120°$ |
| $\phi_2^R=+120°$ | $\phi_2^G=+120°$ | $\phi_2^B=+120°$ |
| $\phi_1^R=+120°$ | $\phi_1^G=+240°$ | $\phi_1^B=0°$ |

The calculated phase angle relationships summarized in the TABLE, point up the reason that the combining means 50, 60 and 70 respectively generate outputs which depend upon the blue, green and red components of the scene area being scanned by camera tube 13. For each of the adders 51, 61 and 71, only one scanned primary color component gives rise to three simultaneous signals (from three successive scanlines) which are in phase and will therefore add to give a signal which is a function of of that particular color intensity at the scanned area. The other two primary colors, or components thereof, give rise to three signals that are mutually 120° out of phase. Thus, the fundamental spectral components of the three signals will substantially cancel if they are of about the same amplitude. The assumption of substantially equal amplitudes over a three scanline vertical area is compatible with conventional color resolution requirements for television.

From the above it is seen that the output of adder 51 is the "blue" color signal since only a blue component of the object scene will result in inputs to adder 51 that are in phase (i.e., all −120° for the reference of FIG. 3). The presence of either of the other two primaries in the object field will yield inputs to adder 51 that are 120° out of phase with each other. For the same reason, the output of the adders 61 and 71 are the green and red color signals, respectively.

It will be appreciated that with the present invention the hue information comes from a single carrier. Any change in the magnitude of the color carrier, caused by beam defocusing or other spatially dependent factors, does not result in a hue shift. The saturation will be effected, but it is well known in the color art that if distortion must exist it is preferable that it should be distortion of saturation but not of hue.

Figure 4:
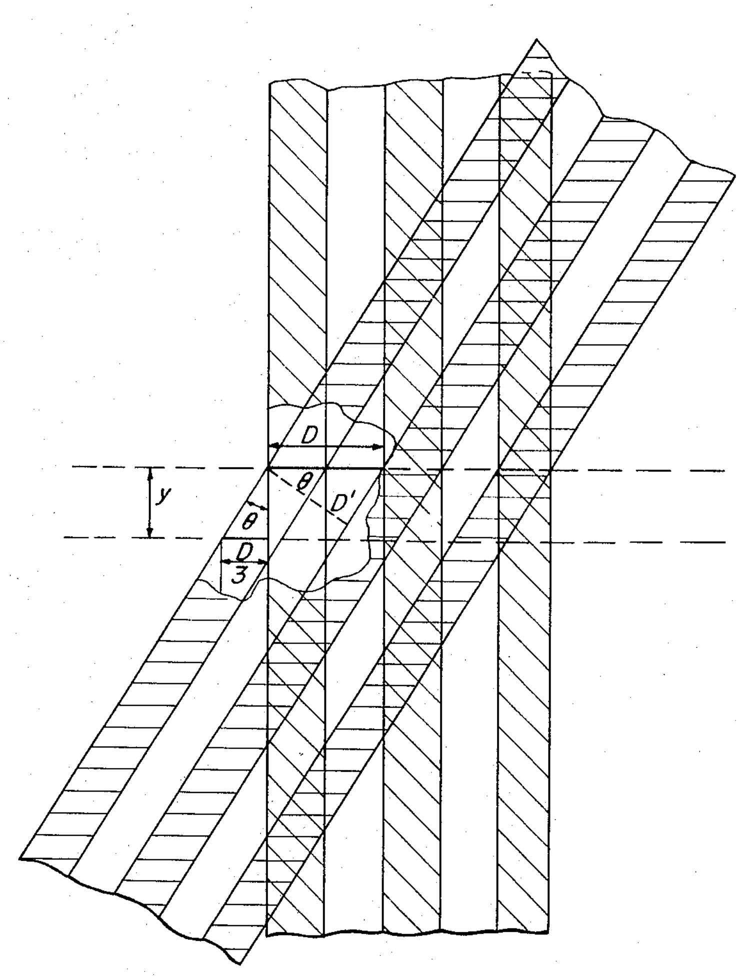
FIG. 4 is a diagram of stripes that is useful in describing the calculation of appropriate stripe angles for an embodiment of the invention.

FIG. 4 helps illustrate the manner in which the stripe configurations, and especially the angle $\theta$, are selected. The main objectives are to achieve three color carrier signals of substantially the same frequency and to have a 120° line-to-line phase difference for two of the colors. In the FIGURE, for purposes of clarity, only two sets of stripes are shown; viz, the vertical stripes (which are magenta in the present embodiment) and the set of stripes at an angle of $+\theta$ with respect to the vertical (which are yellow in the present embodiment). The cyan stripes of the present embodiment will have the same width as the yellow stripes and the same angle $\theta$ with respect to the vertical, but of opposite angular orientation.

The distance from the beginning of one vertical stripe to the beginning of the next one (the space period) is denoted as $D$. Two successive horizontal scanlines are shown as dashed lines and their vertical separation is called $y$. The slanted stripes are proportioned to give the same space period of $D$ with respect to horizontal scanlines, and this requires that $D' = D\cos\theta$ where $D'$ is the normal space period of the slanted stripes. In accordance with the requirements set forth, the lower scanline should result in a signal that leads its previous scanline counterpart by 120°. This means that the lower scanline should begin to traverse a particular slanted stripe at a position which preceeds its traversal point on the previous scanline by one-third of a period, or a distance of $D/3$. It follows from examining FIG. 4 that the appropriate expression for $\theta$ is:

$$\tan\theta = D/3/Y = D/3y \quad (1)$$

The space period $D$ can be expressed as the product of the horizontal time period, $T_H$, and the horizotnal velocity of the scanning beam, $v_H$. The time period $T_H$ is the inverse of the color carrier frequency of 4.5 MHz and the velocity $V_H$ is equal to the width of the area being scanned, $A$, divided by the active horizontal scan time of 52.2 microseconds, so we have:

$$D = T_H\ V_H = 1/4.5 \times 10^6 \times A/52.2 \times 10^{-6} = A/234.90 \quad (2)$$

The scanline pitch, $y$, can be expressed as the product of the vertical time period $T_v$ and the vertical scan velocity $V_v$. The time period $T_v$ is 63.5 microseconds, the time that it takes for the scanning beam to return to the same horizontal position on the next scanline.

The vertical scan velocity is equal to the height of the area being scanned, $Y$, divided by the active vertical scan time of 15.4 milliseconds, so we have $$y = T_vV_v = 63.5 \times 10^{-6} \times Y/(15.4 \times 10^{-3}) = 0.0041\ Y \quad (3)$$

Substituting the expressions for $D$ and $y$ from equations (2) and (3) into equation (1) gives:

$$\tan\theta = D/3y = [A/234.90/(3)\,(0.0041Y)] = 0.344(A/Y) \quad (4)$$

The ratio of the width of the scanned area to the height of the scanned area is the aspect ratio of the scanned area which, for conventional television, is 4/3. Substituting this figure in equation (4) gives:

$$\tan\theta = (0.344)(1.33) = 0.46$$

$$\theta = 24.7°$$

Thus, for conventional television requirements, the desired angle $\theta$ is 24.7°.

The above description has been made with reference to a particular embodiment, but it will be appreciated that modifications are available within the spirit of the invention. For example, while a filter having superimposed sets of stripes is suggested, it is possible to use three independent gratings in conjunction with a registered optical system as is described, for instance, in U.S. Pat. No. 3,510,575. Also, while the present description emphasizes development of a color television camera system, one skilled in the art could apply the disclosed principles to a film system wherein the filtered image is recorded on a monochrome film before the scanning thereof. This technique is described, for example, in the above-referenced U.S. Pat. No. 3,647,943.

The foregoing specifications and the claims which follow make reference to the term "successive scanlines." This term has been utilized in the specification to represent scanlines that occur successively in time during a single scanning field. However, conventional television utilizes an interlaced scanning pattern wherein positionally successive scanlines on the display actually occur during successive fields of a video frame. Persons skilled in the art will appreciate that the scheme of the present invention could be implemented using positionally successive scanlines by employing a one-field delay. Therefore, it is intended that the term "successive scanlines" generically represent both the time successive and positionally successive situations.

I claim:

1. A system for generating three coherent color component signals representative of the color content of a scene, comprising:

a color stripe filter disposed in the optical path of the scene, said filter having three sets of parallel stripes, each set having a different characteristic color and a different orientation in the plane perpendicular said path;

means for electronically scanning the image projected through said filter in a line pattern and for generating signals representative of the filtered image;

delay means responsive to the output of said scanning means for simultaneously deriving first, second, and third video signals generated during three successive scanlines; and first, second and third combining means, each of which combines the three video signals in a different phase relationship to generate one of the coherent color component signals.

2. A system in accordance with claim 1 wherein each of said combining means adds the three video signals in a different phase relationship to generate one of the color component signals.

3. A system in accordance with claim 1 wherein the orientation of one of said sets of stripes is such that the scanning of said one set of stripes on a particular line produces a video signal component that is shifted in phase by +120° with respect to the video signal component produced when said one set of stripes is scanned on the next line.

4. A system in accordance with claim 3 wherein the orientation of a second of said sets of stripes is such that the scanning of said second set of stripes on said particular line produces a video signal component that is shifted in phase by −120° with respect to the video signal component produced when said second set of stripes is scanned on said next line.

5. A system in accordance with claim 4 wherein the orientation of the third of said sets of stripes is such that the scanning of said third set of stripes on said particular line produces a video signal component that is in phase with respect to the video signal component produced when said third set of stripes is scanned on said next line.

6. A system in accordance with claim 2 wherein said delay means comprises two delay lines, each of which provides a delay of 120° less then the duration of a full horizontal scanline.

7. A system in accordance with claim 2 wherein said first combining means adds said first, second and third video signals in phase, and said second combining means adds said first, second and third video signals in phase relationships that are multiples of 120°.

8. A system in accordance with claim 7 wherein said third combining means adds said first, second and third video signals in phase relationships that are multiples of 240°.

9. A system in accordance with claim 1 further comprising means for filtering the signals from said scanning means to produce luminance signals.

10. A system in accordance with claim 1 wherein the three stripe set colors are yellow, cyan and magenta.

11. A system for generating three coherent color component signals from a composite image having a first color spatially modulated in a stripe pattern with a first orientation, a second color spatially modulated in a stripe pattern with a second orientation, and a third color spatially modulated in a stripe pattern with a third orientation, comprising:

means for scanning said image in a line pattern and for generating signals representative of the scanned image;

delay means responsive to the output of said scanning means for simultaneously deriving first, second and third video signals generated during three successive scanlines; and first, second and third combining means, each of which combines the three video signals in a different phased relationship to generate one of the coherent color component signals.

12. A system in accordance with claim 11 wherein each of said combining means adds the three video signals in a different phase relationship to generate one of the color component signals.

13. A system in accordance with claim 12 wherein said delay means comprises two delay lines, each of which provides a delay of 120° less than the duration of a full horizontal scanline.

14. A system in accordance with claim 12 wherein said first combining means adds said first, second and third video signals in phase, and said second combining means adds said first, second and third video signals in phase relationships that are multiples of 120°.

15. A system in accordance with claim 14 wherein said third combining means adds said first, second and third video signals in phase relationships that are multiples of 240°.

16. A system in accordance with claim 11 further comprising means for filtering the signals from said scanning means to produce luminance signals.

17. A system in accordance with claim 11 wherein the three modulating colors are yellow, cyan and magenta.

18. A color encoding filter suitable to be disposed in the optical path between a scene and a means for deriving the light content from the scene, comprising:

a first set of mutually parallel stripes of a first color and having a first orientation in the plane perpendicular said path;

a second set of mutually parallel stripes of a second color and having a second orientation in said plane, said second orientation being at an angle of about 24.7° with respect to said first orientation; and a third set of mutually parallel stripes of a third color and having a third orientation in said plane, said third orientation being at an angle of about −24.7° with respect to said first orientation.

* * * * *

Notice of Adverse Decision in Interference

In Interference No. 98,746, involving Patent No. 3,780,212, W. E. Glenn, Jr., COLOR FILTER AND SINGLE TUBE COLOR TELEVSION CAMERA SYSTEM UTILIZING SAME, final judgment adverse to the patentee was rendered Jan. 24, 1975, as to claims 1–5, 7, 9–12, 14, 16 and 17.

[*Official Gazette May 6, 1975.*]